(12) United States Patent
Lin

(10) Patent No.: US 8,781,032 B2
(45) Date of Patent: Jul. 15, 2014

(54) COMMUNICATION TERMINAL AND METHOD AND PROGRAM FOR CONTROLLING THE SAME

(75) Inventor: Hua Lin, Kanagawa (CN)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 236 days.

(21) Appl. No.: 13/319,249

(22) PCT Filed: Apr. 8, 2010

(86) PCT No.: PCT/JP2010/056362
§ 371 (c)(1),
(2), (4) Date: Nov. 7, 2011

(87) PCT Pub. No.: WO2010/128612
PCT Pub. Date: Nov. 11, 2010

(65) Prior Publication Data
US 2012/0057659 A1 Mar. 8, 2012

(30) Foreign Application Priority Data
May 7, 2009 (JP) .................................. 2009-112642

(51) Int. Cl.
*H04L 27/06* (2006.01)
*H04L 27/08* (2006.01)
(52) U.S. Cl.
USPC .......................................... 375/340; 375/316
(58) Field of Classification Search
USPC ....................................................... 375/340
See application file for complete search history.

(56) References Cited

U.S. PATENT DOCUMENTS

| | | | |
|---|---|---|---|
| 5,745,005 A | 4/1998 | Natsumi | |
| 2004/0148396 A1* | 7/2004 | Meyer et al. | 709/227 |
| 2004/0240531 A1 | 12/2004 | Black et al. | |
| 2005/0107113 A1 | 5/2005 | Laune et al. | |
| 2007/0071070 A1 | 3/2007 | Dominique et al. | |
| 2008/0095132 A1* | 4/2008 | Lindoff et al. | 370/342 |

FOREIGN PATENT DOCUMENTS

| | | |
|---|---|---|
| CN | 1698278 | 11/2005 |
| JP | 9-074384 | 3/1997 |
| JP | 2004-159284 | 6/2004 |
| JP | 2005-033430 | 2/2005 |
| JP | 2006-080787 | 3/2006 |
| JP | 2007-010323 | 1/2007 |

OTHER PUBLICATIONS

European Search Report—PCT/JP2010/056362—Sep. 20, 2012.
International Search Report, PCT/JP2010/056362, May 18, 2010.
CN Office Action dated Sep. 23, 2013, with English translation; Application No. 201080020255.4.

* cited by examiner

*Primary Examiner* — Erin File
(74) *Attorney, Agent, or Firm* — Young & Thompson

(57) ABSTRACT

A communication apparatus includes two or more receiving units differing in characteristics. The apparatus further includes a data detecting unit detecting data to be received, in an input signal, and a selecting unit that selects one out of the two or more receiving units, depending upon detected result and characteristics of receiving units. In case data to be received is not contained in the input signal, the selecting unit selects a receiving unit whose power consumption during a period of time of not receiving the data is smaller than that of the other receiving unit(s) during a period of time of not receiving the data. In case the data to be received is contained in the input signal, the selecting unit selects a receiving unit from which a most satisfactory receiving quality is expected depending upon propagation environments of the input signal.

17 Claims, 14 Drawing Sheets

COMMUNICATION TERMINAL AND METHOD AND PROGRAM FOR CONTROLLING THE SAME

REFERENCE TO RELATED APPLICATION

The present invention is based upon and claims the benefit of the priority of Japanese Patent Application No. 2009-112642 filed on May 7, 2009, the disclosure of which is incorporated herein in its entirety by reference.

TECHNICAL FIELD

This invention relates to a communication terminal and, more particularly, to a communication terminal that selects receiving units which differ in characteristics depending upon whether or not data to be received exists in an input signal. It also relates to a method and a program for controlling the communication terminal.

BACKGROUND

Currently, the standardization of the W-CDMA (Wideband Code Division Multiple Access), as a format of a third generation mobile communication system, is progressing in the 3GPP (Third Generation Partnership Project), which is an international standard. As one of themes of this standardization, an HSDPA (High Speed Downlink Packet Access) which provides high speed transmission at scores of Mbps in the downlink has been prescribed. The HSDPA uses an adaptive modulation and coding system AMC (Adaptive Modulation and Coding). The AMC is featured by adaptive switching between the QPSK (Quadrature Phase Shift Keying) system, which is 4-valued quadrature phase shift modulation, and the QAM (Quadrature Amplitude Modulation), which is a 16-valued quadrature amplitude modulation, depending upon radio environments prevailing between the base and mobile stations.

The HSDPA adopts an H-ARQ (Hybrid Automatic Repeat reQuest) system. In the H-ARQ system, if a mobile station has detected an error in data received from a base station, data is re-sent from the base station on request from the mobile station. The mobile station performs error correction and decoding using both the received data and the re-sent data. Thus, in the H-ARQ, the mobile station effectively utilizes the data, already received, even if it is corrupted with errors, thus improving the gain of the error correction and decoding to suppress the number of times of data re-send operations from increasing.

If, in the W-CDMA communication system, pursuant to 3GPP, the HSDPA is used, the AMC scheme is adopted. The AMC is such a technique that adaptively changes the code rate in error correction or the modulation scheme in response to variations in the network quality. In the AMC technique, the encoding/modulation scheme which provides for a higher rate is used in case of a satisfactory network quality to elevate the transmission rate. If the network quality is not satisfactory, the encoding/modulation scheme, providing for a low rate, is used to lower the transmission rate to assure reliable packet transmission.

In general, the receiving scheme, adapted to cope with HSDPA, is of two configurations. One is the equalization (Equalization) scheme which moderates the adverse effect of multiple paths, and the other is the RAKE receiving scheme which maximizes the ratio between the combined multipath signals and the noise without taking account of the interference between multiple signal paths. The equalization receiving scheme is in need of voluminous processing operations, such as those by inverse matrix calculations, thus increasing the power consumption of the entire apparatus. On the other hand, the RAKE receiving scheme is simple to implement and low in power consumption. Heretofore, in order for the receiving side to get an optimum receiving quality, the above two receiving schemes are combined together and switched depending upon prevailing communication environments by way of exercising optimization control (in Patent Documents 1 and 2, for example).

To improve the throughput of the entire system, Patent Document 1 discloses selecting the RAKE receiving scheme or the linear equalization receiving scheme based upon the signal to interference ratio, referred to below as 'SIR', Doppler shift or the interference power. Patent Document 2 discloses providing a copy portion (Cyclic Prefix, abbreviated to CP) of an information signal in a transmission slot during the high-speed transmission, such as to assure processing for effective equalization in a receiving unit. During the low-speed transmission, data is transmitted without providing the CP in the transmission slot. As a result, a satisfactory communication quality may be obtained under a variety of communication environments. These conventional techniques switch between the receiving schemes to improve the communication quality.

RELATED TECHNICAL PUBLICATIONS

Patent Documents

Patent Document 1: JP Patent Kokai Publication No. JP-P2004-159284A (page 7, FIG. 1)
Patent Document 2: JP Patent Kokai Publication No. JP-P2005-33430A (pages 8 to 9, FIG. 10)

SUMMARY

When a terminal user utilizes packet services, it may occur frequently that, even during packet communication (with a physical channel necessary for HSDPA communication then being OPEN), the period of time during which packet data is actually received is shorter, while the period of time during which the packet data is not received is longer, depending upon sorts of services rendered. On the other hand, in such system where the equalization scheme is switched to the RAKE scheme and vice versa, depending upon the state of radio waves, the ratio of the period of time during which the equalization scheme is selected is higher, as a matter of fact, in actual use environments. During the period of time the packet data is not received, the terminal decodes solely the HSDPA control channel, and hence even the RAKE receiving scheme can provide sufficient service. Under such condition, if the equalization scheme be selected, depending upon the environments of the communication paths, there is raised a problem that the power consumption at the terminal is wastefully increased.

With such problem taken into consideration, it is an object of the present invention to provide a communication terminal in which a receiving unit which is more desirable is selected in case data to be received is not contained in the received signal.

To accomplish the above object, a communication device of the present invention includes two or more receiving units differing from one another in operating characteristics, a data selecting unit that decides whether or not data to be received is contained in an input signal, and a selecting unit. The selecting unit selects one out of the two or more receiving units based upon presence or absence of the data to be received and upon characteristics of the receiving units.

Preferably, the selecting unit selects such a receiving unit whose power consumption during a period of time it is not receiving data is smaller than that of the remaining receiving unit(s).

Also preferably, in case one out of the two or more receiving units has been selected, the remaining receiving unit(s) is set in a state of low power consumption.

In case there is data to be received in the input signal, preferably a receiving unit is selected which will yield a most satisfactory receiving quality depending upon propagation environments of the input signal.

Preferably, the communication device is a wireless communication device. Also it is preferred that in case the data detecting unit failed in decoding a control channel of wireless communication consecutively a number of times equal to a first preset number, the data detecting unit decides that there is no data to be received, whereas in case the data detecting unit succeeded in decoding the control channel consecutively a number of times equal to a second preset number, the data detecting unit decides that there is data to be received. Preferably, the first preset number of times is greater than the second preset number of times.

In the communication terminal, communication control method and the communication control program, according to the present invention, the presence or absence of data to be received, in a received signal, is monitored. Based upon the results monitored, one out of two or more receiving units, differing in characteristics from one another, is selected. Hence, an optimum one of the receiving units can be selected to advantage depending upon the presence or absence of data to be received.

If, in the absence of data to be received, the receiving unit, whose power consumption during the period of time there is no data to be received is small, is selected to carry out the receiving processing, and the remaining receiving unit(s) are set in a state of low power consumption. Thus it is possible to save the power of the entire apparatus (or system) or to prolong the battery's useful life.

If there is data to be received, a receiving scheme is to be selected in consideration of propagation environments of the input signal such as to accomplish an optimum receiving quality. By so doing, power saving of the entire apparatus may be achieved while maintaining a high receiving quality.

In case the presence or absence of data to be received is determined depending upon whether or not the control channel may be decoded a preset number of times consecutively, it is possible to avoid a situation in which the receiving units are frequently switched due to incidental variations. In addition, since the presence of data to be received may promptly be detected to allow selecting a receiving unit optimum for data reception, the receiving quality can be maintained at a high level.

PREFERRED MODES

Preferred modes for carrying out the present invention will be explained with reference to the accompanying drawings.
(Exemplary Embodiment 1)

Figure 1:
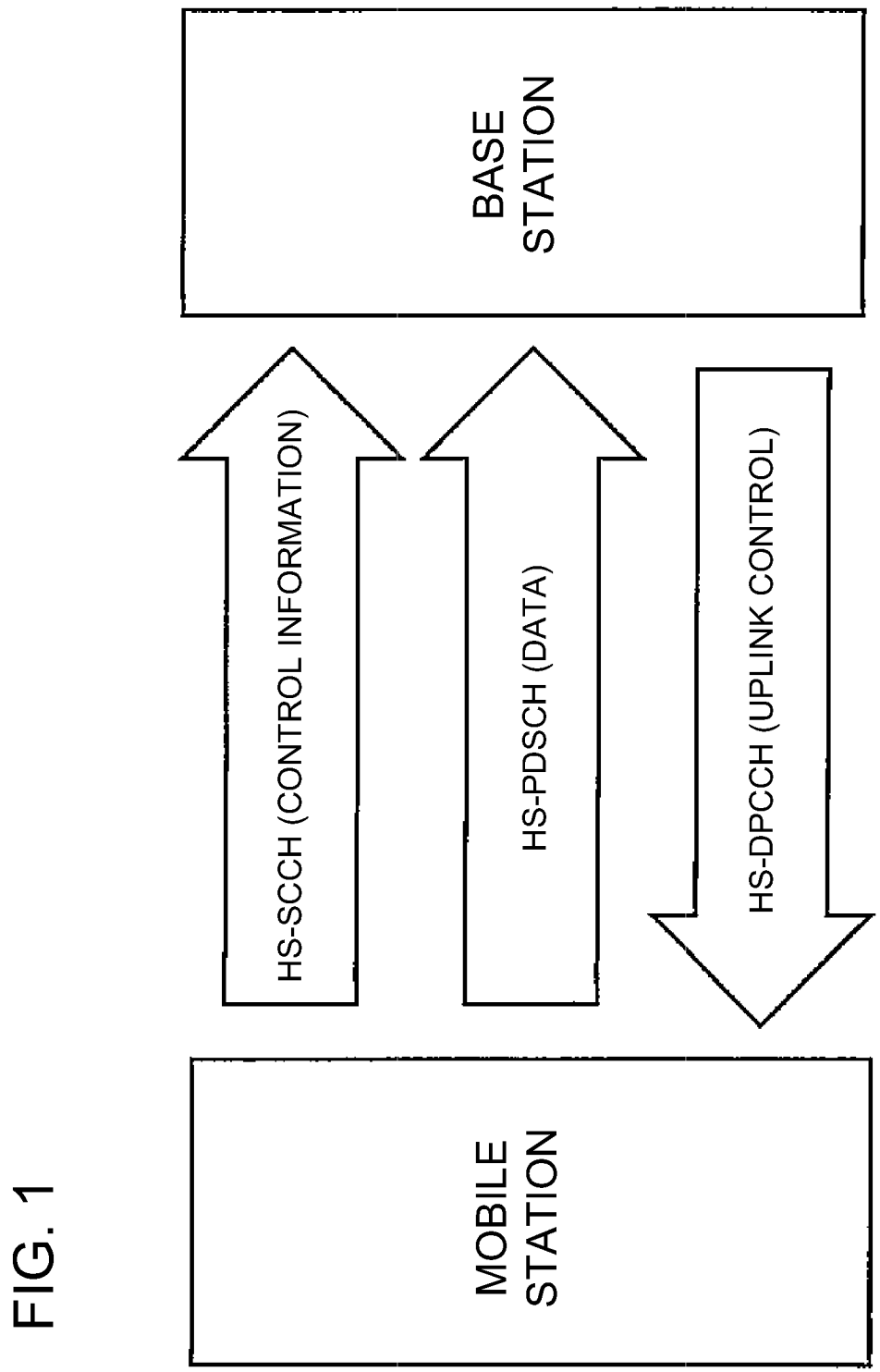
FIG. 1 is a schematic view for illustrating a physical radio channel of HSDPA.

FIG. 1 is a diagram for illustrating an outline of an HSDPA communication system of an exemplary embodiment 1. In FIG. 1, there are shown three principal physical radio channels used in HSDPA. These are an HS-SCCH (High Speed-Shared Control Channel), an HS-PDSCH (High Speed-Physical Downlink Shared Channel) and an HS-DPCCH (High Speed-Dedicated Physical Control Channel). Both the HS-SCCH and the HS-PDSCH are common channels (shared channels) in the downlink direction (the downlink from a base station to a mobile station). The HS-SCCH is a control channel that transmits a variety of parameters concerning data transmitted over HS-PDSCH.

The HS-DPCCH is an individual control channel (dedicated control channel) in the uplink direction (the direction from the mobile station to the base station). The HS-DPCCH is used for the mobile station to transmit an ACK signal or a NACK signal to the base station depending upon the presence or absence of an error in the data received over HS-PDSCH. That is, the HS-DPCCH is a channel over which the result of receipt of data sent over the HS-PDSCH is to be transmitted.

The processing time unit for the physical channel in the HSDPA is TTI (Transmission Time Interval), with 1 TTI being 2 ms (millisecond). The decoding performance of the HS-PDSCH is appreciably influenced by the particular receiving scheme (system) used. In case the mobile station is moving at a low speed, an equalizing unit is used, whereby the multipath effects may be reduced. If conversely the mobile station is moving at an elevated speed, or if the interference power from the other cell(s) is large, a RAKE receiving scheme may yield receiving characteristics better than those obtained with the equalizing unit. These receiving schemes are well-known in the art and hence the corresponding explanation is dispensed with.

Figure 2:
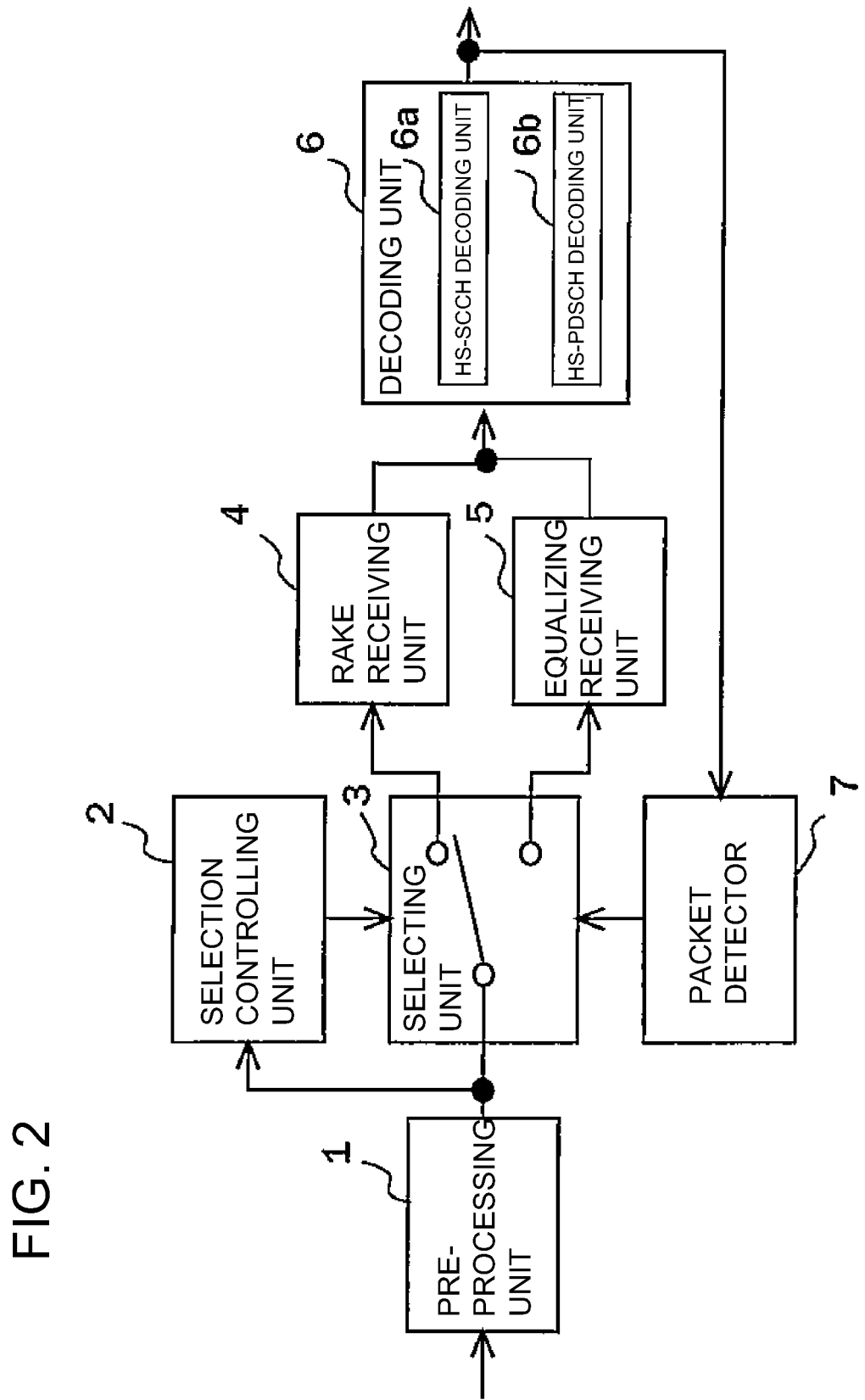
FIG. 2 is a functional block diagram of a wireless communication terminal according to an exemplary embodiment 1 of the present invention.

FIG. 2 depicts a functional block diagram of a wireless communication terminal (mobile station) according to the present invention. As shown therein, the wireless communication terminal of the present invention includes a pre-processing unit 1, a selection controlling unit 2, a selecting unit 3, a RAKE receiving unit 4, an equalizing receiving unit 5, a decoding unit 6 and a packet detecting unit 7. These components are implemented on a wireless communication terminal (mobile station) as hardware, software or firmware, which may be used either alone or in combination. Those skilled in the art may put them together in consideration of miniaturization or maintenance performance of the wireless communication terminal.

Note that the wireless communication terminal has many other functions necessary for a mobile phone. However, those functions that are not relevant to the present invention are not elucidated in the present description. The description on decoding or encoding the physical channel, as needed for HSDPA communication, is also dispensed with.

The pre-processing unit 1 receives the HSDPA signal to perform processing including channel estimation or the like. The selection controlling unit 2 selects the RAKE scheme or the equalizing scheme, as a receiving scheme used in packet reception, based upon an output of the pre-processing unit 1. During a packet is being received, and the wireless communication terminal is moving at a lower speed, the selection controlling unit 2 selects the equalizing receiving scheme to reduce the multipath effect. During a packet is being received, and the mobile communication terminal is moving at an elevated speed, or an interference power applied from other cell(s) is large, the selection controlling unit 2 selects the RAKE receiving scheme to provide for a maximum communication quality.

The selecting unit 3 switches between the RAKE receiving unit 4 and the equalizing receiving unit 5 under control by the selection controlling unit 2 or by the packet detecting unit 7. If a control signal is output from the packet detecting unit 7, the selecting unit 3 prioritizes the selection which is based upon the control signal. If no control signal is output, the selecting unit obeys control from the selection controlling unit 2.

The RAKE receiving unit 4 processes received data in accordance with the RAKE receiving scheme. The equalizing receiving unit 5 processes received data in accordance with the equalization scheme. The equalization scheme is in need of voluminous processing, such as inverse matrix calculations, and hence the device consumes much power. On the other hand, the RAKE scheme is simple to implement and consumes less power. It is by these receiving units 4, 5 that the physical channel signals are de-spread.

The decoding unit 6 includes an HS-SCCH decoding unit 6a and an HS-PDSCH decoding unit 6b. The HS-SCCH decoding unit 6a receives an HS-SCCH input (I and Q components that are in quadrature to each other) to decode the HS-SCCH signal. The HS-PDSCH decoding unit 6b decodes the HS-PDSCH signal to output the decoded signal to component parts, not shown, which are in need of the signal.

An output of the decoding unit 6 is delivered to the packet detecting unit 7. The packet detecting unit 7 decides the presence or absence of packet data in a received signal by a sequence of operations as later explained. In case a given time interval is determined to be devoid of packet data, the receiving scheme is forcibly set at the RAKE scheme.

Figure 3:
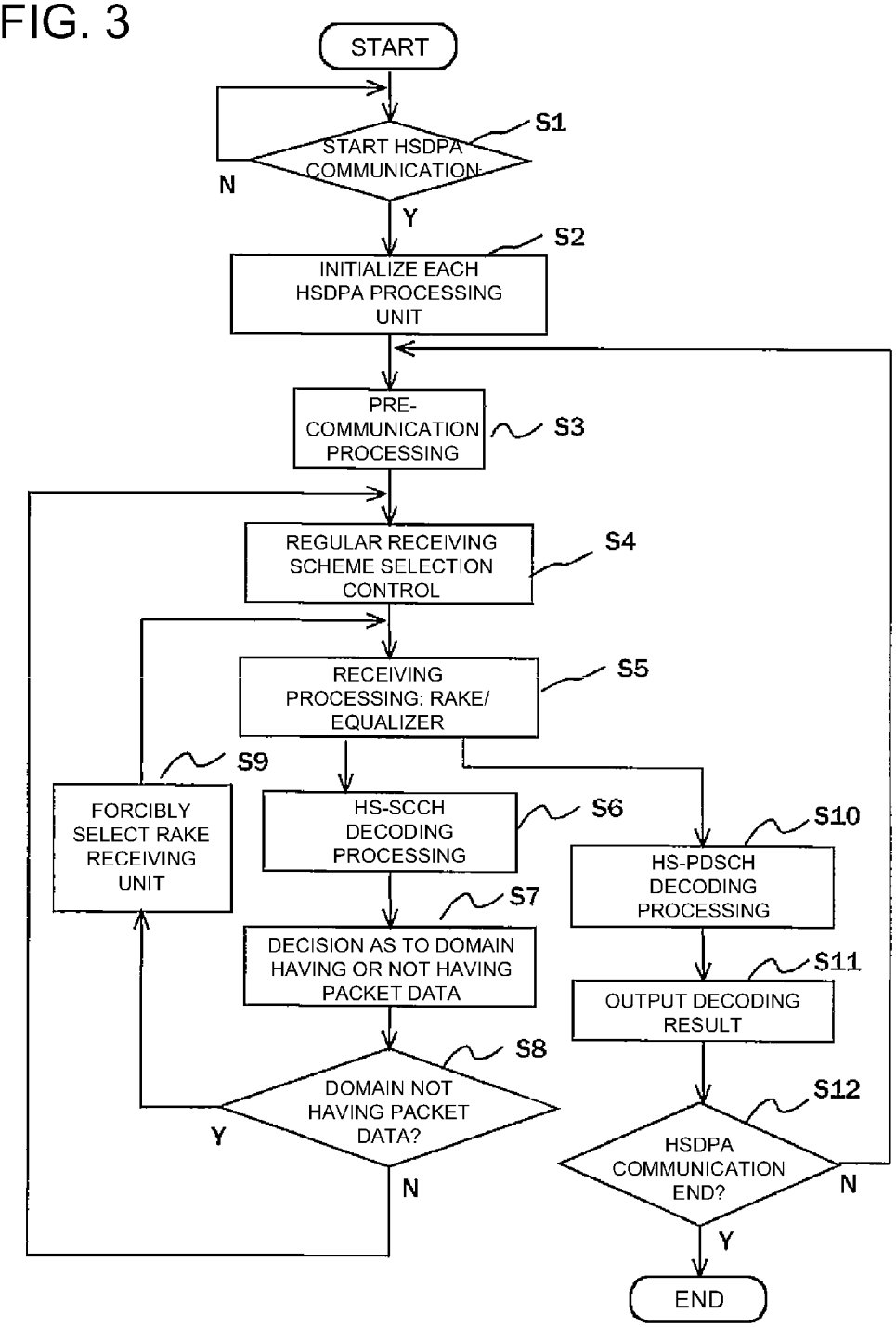
FIG. 3 is a flowchart for illustrating a method for controlling the wireless communication terminal according to exemplary embodiment 1 of the present invention.

Referring to FIGS. 3 to 10, the method of controlling the wireless communication terminal of the present invention will now be explained. FIG. 3 depicts a flowchart for illustrating the wireless communication terminal shown in FIG. 2. For example, if, by a user's operation, the wireless communication terminal has entered from a sleep state or other operation modes to an HSDPA high-speed packet communication state (step S1: Y), then each HSDPA processing unit is initialized (step S2). A received signal is delivered to the pre-processing unit 1 where it is subjected to pre-processing, such as processing of channel estimation (step S3). Here, a signal receiving scheme, which will yield an optimum communication quality for the selection controlling unit 2, herein the RAKE scheme or the equalization scheme, is selected depending upon an estimated condition of the communication path (step S4). Note that the RAKE scheme or the equalization scheme is configured to be selected by programming depending upon pre-defined conditions. For example, the RAKE scheme is selected during the high speed movement or in case of marked interference power from a neighbor cell(s), and the equalization scheme is selected otherwise. The processing of signal reception then is executed in accordance with the reception system selected (step S5). The so received signal is then delivered to the decoding unit 6.

In the decoding unit 6, initially the HS-SCCH is decoded by the HS-SCCH decoding unit 6a (step S6). Depending upon the results, the packet detecting unit 7 decides whether or not there is packet data (step S7). This processing for decision will be explained in detail hereinbelow. If it is determined that the time period is not that when there exists packet data (step S8: Y), the packet detecting unit 7 forcibly designates the RAKE receiving scheme (step S9). This causes the selecting unit 3 to change over to the RAKE receiving scheme to achieve power saving in comparison with the case of reception in accordance with the equalization scheme. Note that, if there is no packet data, only the HS-SCCH is decoded. This may readily be coped with by the RAKE receiving scheme.

If conversely it is decided that time period is such a one when there exists packet data, regular control for selecting the receiving scheme at the time of packet reception is exercised (processing transfers to step S4). This selects a receiving scheme (RAKE scheme or an equalization scheme) which will yield a most optimum throughput depending upon communication environments.

If the HS-SCCH decoding has met with success, the HS-PDSCH decoding unit 6a performs HS-PDSCH decoding (step S10) so that a decoded signal is output (step S11). The wireless communication terminal repeats the processing as from step S3 until the HSDPA communication comes to a close (step S12: N).

Figure 4:
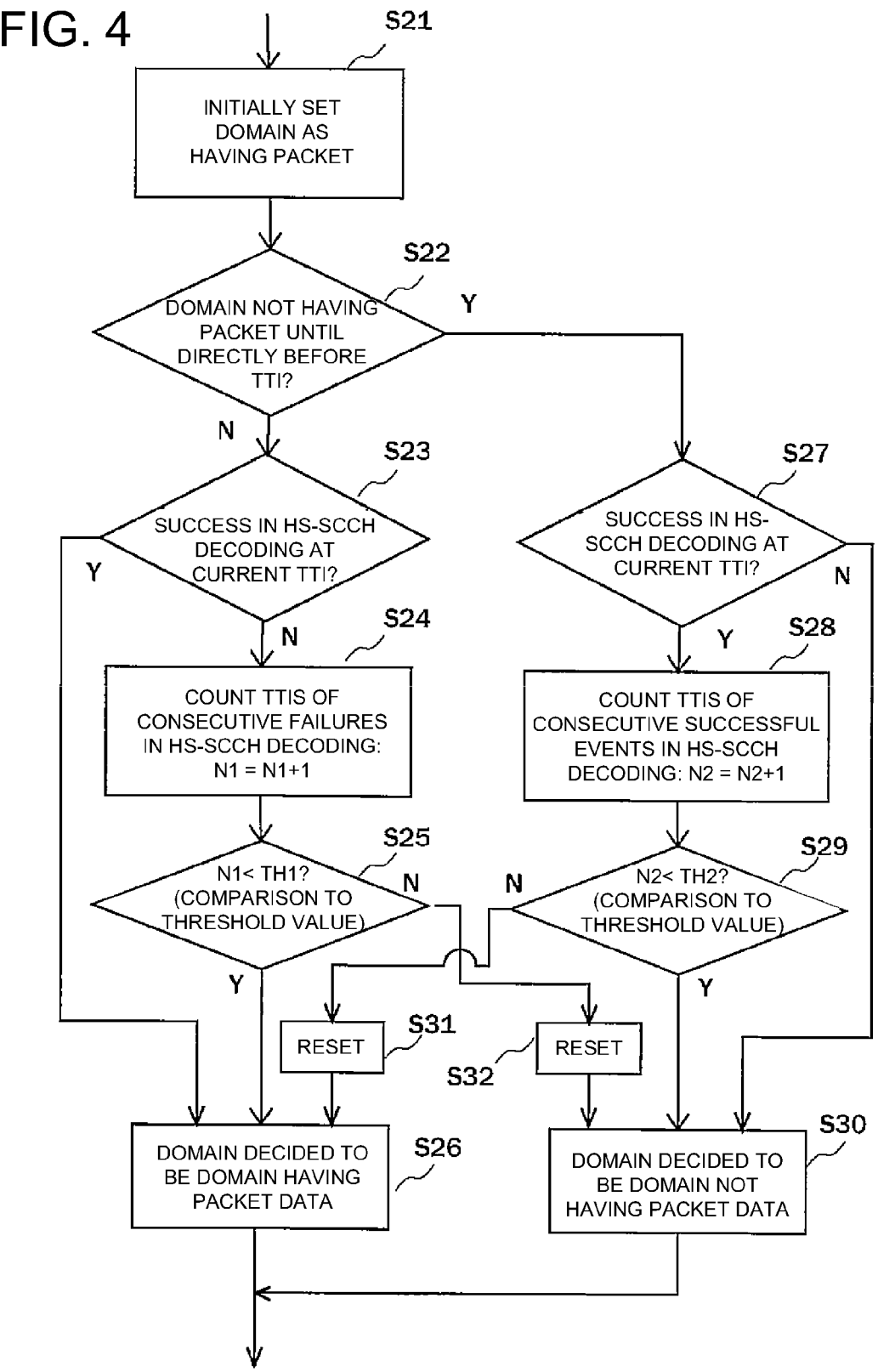
FIG. 4 is a flowchart for illustrating details of step S7 of FIG. 3.

FIG. 4 shows, in depth, the flow of the processing of decision as to presence or absence of packet data in step S7. It is assumed that there exist packet data at a boot time of the wireless communication terminal or on startup of communication. Processing is started under this assumption (step S21). If it is determined that there exist packet data until TTI which is the time before startup of processing (Y of step S22), the result of decoding of HS-SCCH at the current TTI is checked (step S23). If the HS-SCCH decoding at the current TTI has met with success (Y of step S23), the current TTI is also concluded to be a time period in which there exist packet data. Processing then transfers to step S26.

If the HS-SCCH decoding at the current TTI has failed (N of step S23), the number of times of failed HS-SCCH decoding (cumulative number of times N1 of failed decoding) is counted up (step S24). The count value N1 is then compared to a preset threshold value TH1, for instance, 30 (step S25). In case N1 is smaller than a threshold value TH1, it is concluded that the time period is such a one when there exist packet data (S26). If conversely N1 has exceeded the threshold value TH1, a counter, not shown, is reset (step S32). The time period following the next TTI is determined to be a time period in which there is no packet data (step S30).

If it is determined in step S22 that there exist no packet data until the directly before TTI (N of step S22), the result of the HS-SCCH decoding at the current TTI is checked (step S27). If the HS-SCCH decoding at the current TTI has not met with success, it is concluded that no packet data exists at the current TTI as well. Processing then transfers to step S30. In case the HS-SCCH decoding at the current TTI has met with success, the number of successful HS-SCCH decoding events (cumulative number of successful decoding events) N2 is counted up (step S28). The counted number N2 is compared to a preset threshold value TH2, for instance 3. If N2 is smaller than the threshold value TH2, it is concluded that the current TTI is again such a time period in which there exist no packet data (step S30). In case N2 has exceeded the threshold value TH2, the counter is reset (step S31). It is then concluded that, as from the next TTI on, there exist packet data (step S26). After the decisions of steps S26 and S30, processing transfers to step S8 of FIG. 3.

Figure 5:
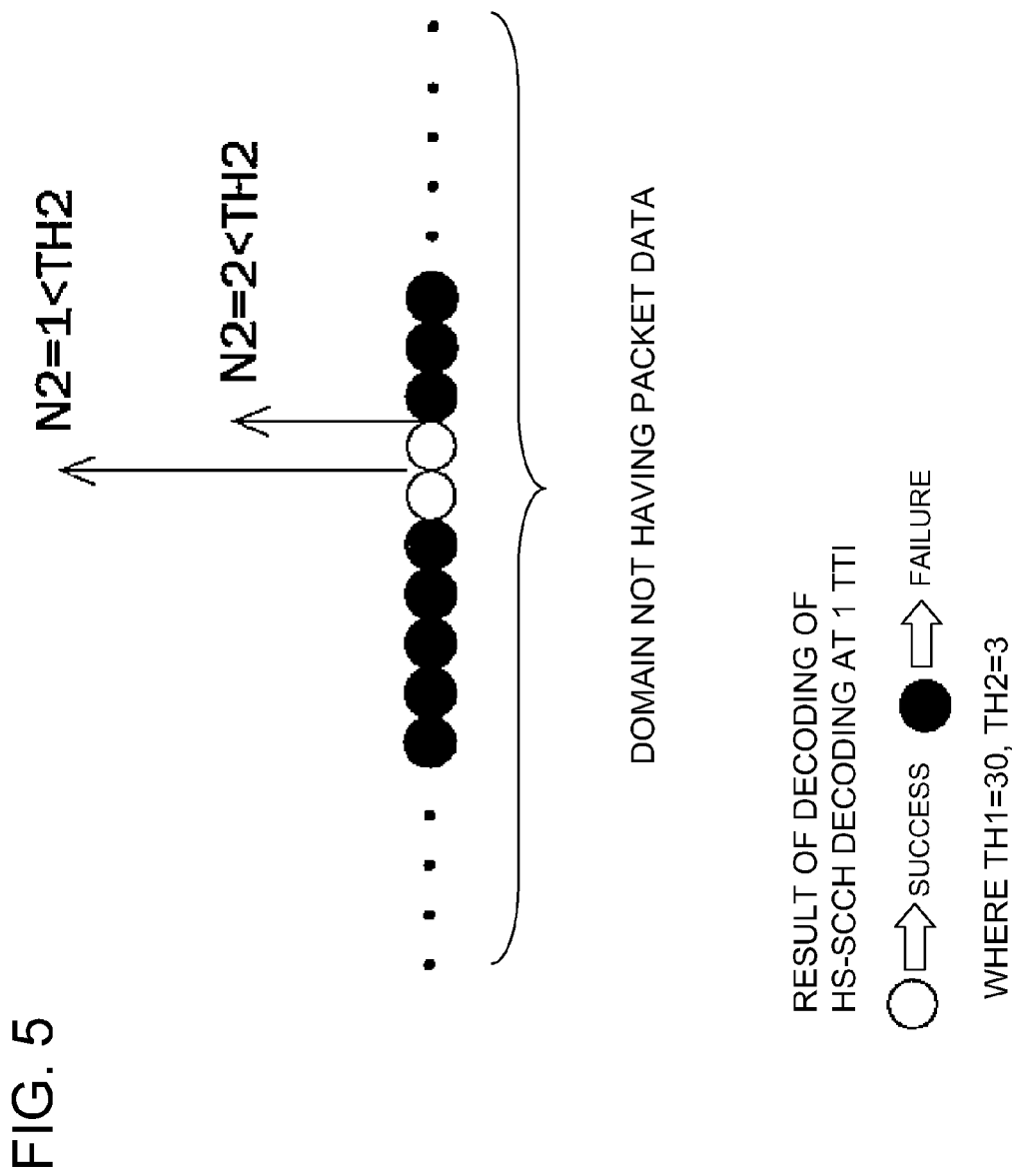
FIG. 5 is a conceptual view for illustrating a method for deciding the presence or absence of a packet according to exemplary embodiment 1 of the present invention.

The processing of decision on the possible presence or absence of the packet data in the present exemplary embodiment is shown conceptually in FIGS. 5-10. In the present exemplary embodiment, TH1=30 and TH2=3 are set. In the case of FIG. 5, there sustains a number of contiguous time periods devoid of packet data. In the next following two TTIs, HS-SCCH decoding succeeds. However, in subsequent TTIs, decoding again fails. In this case, the number of cumulative successful decoding events N2=2 is less than the threshold value TH2=3. Hence, the time period of these two successful decoding events is concluded to be a continuation of the time period in which there exist no packet data.

Figure 6:
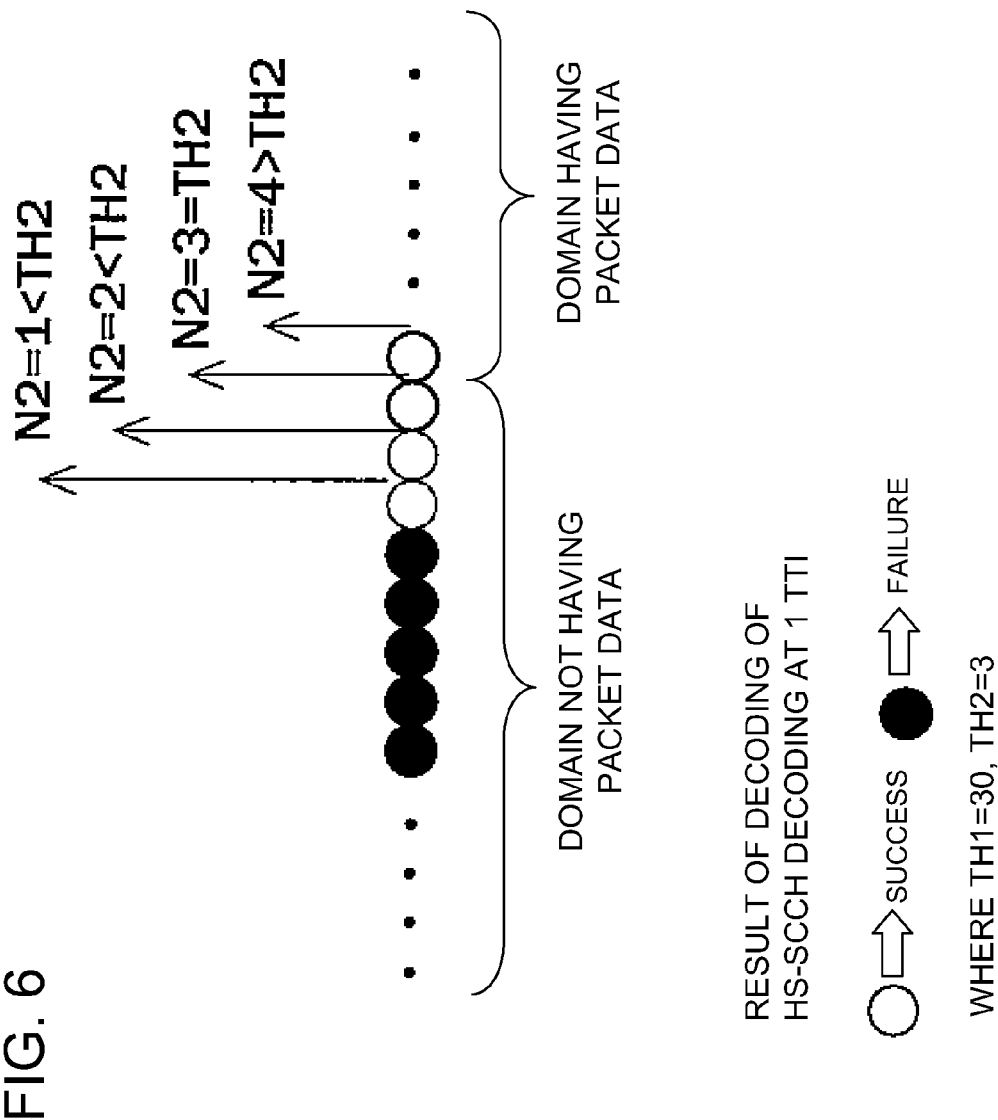
FIG. 6 is a conceptual view for illustrating an Example of the method according to the present invention.

In the case of FIG. 6, there sustains a time period in which there exists no packet data. This time period is followed by a succession of not less than four HS-SCCH successful decoding events. In this case, as long as the number of times of three contiguous successful decoding events is less than the threshold value TH2=3, no packet data are decided to exist. However, after the successful HS-SCCH decoding events throughout the three consecutive TTIs, it is concluded that the time period in which there exist packet data has commenced.

Figure 7:
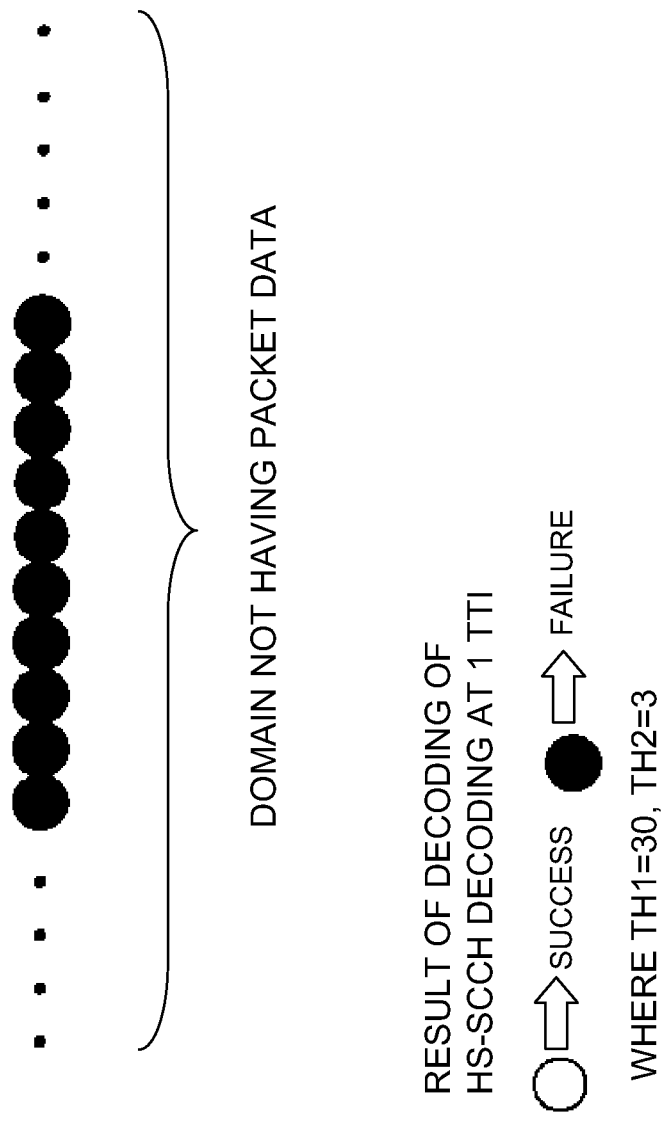
FIG. 7 is a conceptual view for illustrating another Example of the method according to the present invention.

In the case of FIG. 7, a number of HS-SCCH decoding events failed consecutively. Hence, the time period is concluded to be such a time period in which there exist no packet data consecutively.

Figure 8:
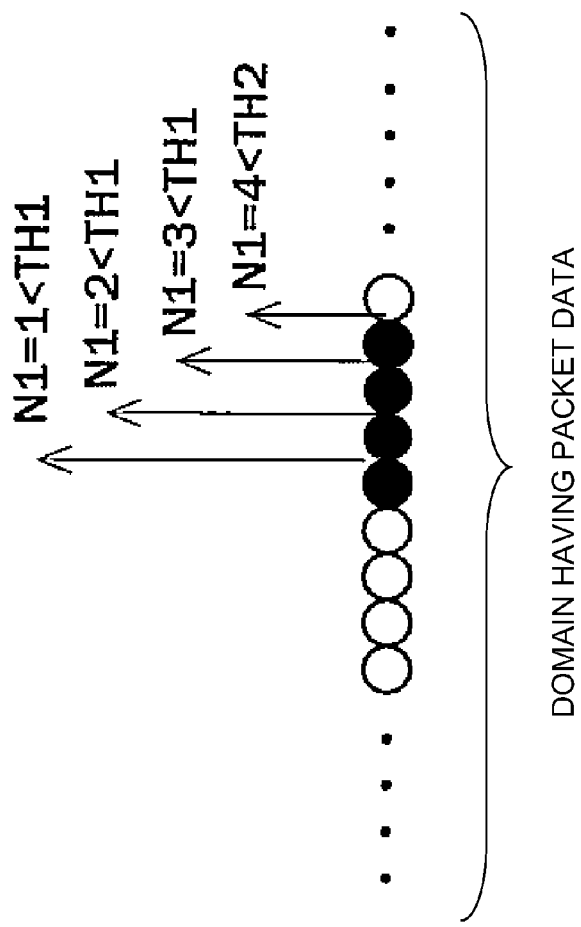
FIG. 8 is a conceptual view for illustrating a further Example of the method according to the present invention.

In the case of FIG. 8, there is a continuous time period with packet data. This time period is followed by four consecutive TTIs in which the HS-SCCH decoding fails and then by consecutive time periods with successful HS-SCCH decoding. In this case, the cumulative number of times of failed decoding N1=4 is smaller than the threshold value TH1=30. Hence, the period of failed decoding is decided to be a continuation of the period in which there exist packet data.

Figure 9:
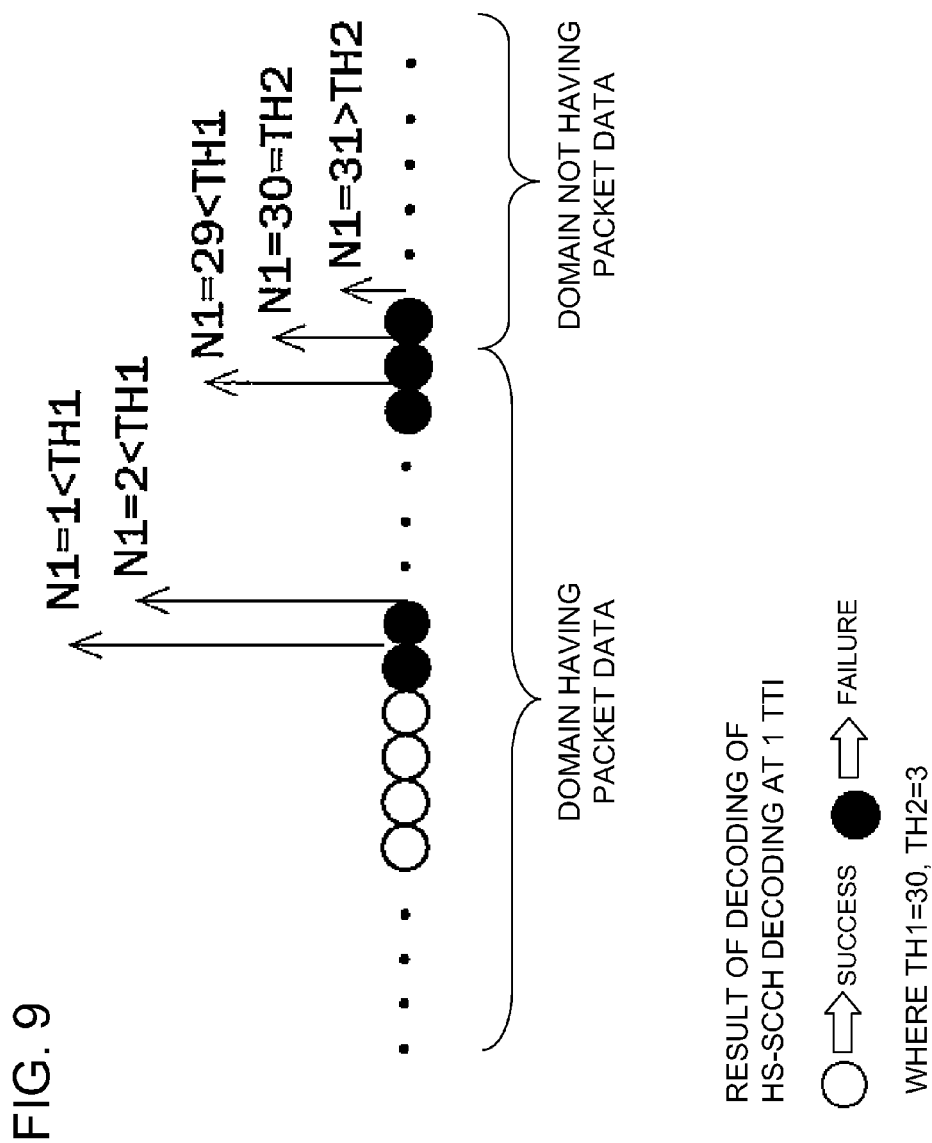
FIG. 9 is a conceptual view for illustrating a further Example of the method according to the present invention.

In the case of FIG. 9, there sustains a period with packet data followed by a period of contiguous HS-SCCH failure events. In this case, the period with the number of consecutive events of decoding failures N1, less than 30, is concluded to be a period in which there exist packet data. The time when Ni has exceeded 30 is decided to be the beginning of a time period when there exist no packet data.

Figure 10:
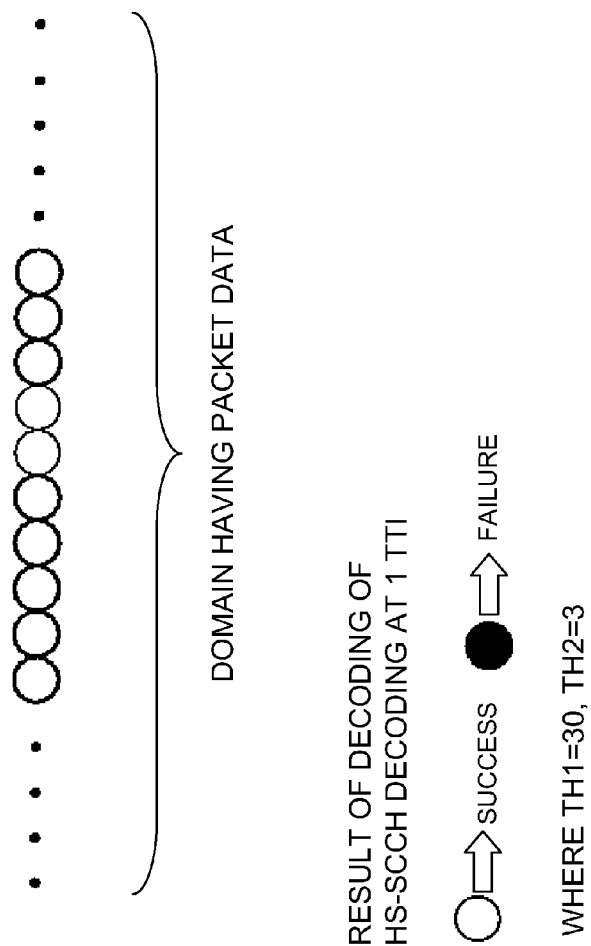
FIG. 10 is a conceptual view for illustrating yet another Example of the method according to the present invention.

In the case of FIG. 10, a number of HS-SCCH decoding events meet with success consecutively and hence the time period is concluded to be a continuation of a time period in which there exist packet data.

Thus, control is exercised in such a manner that, when the same result of decision has sustained a number of times not less than a preset threshold value, the result of decision is switched between the presence and absence of the packet data. This eliminates incidental fluctuations caused by some reason or other, such as one-shot switching from failure to success in HS-SCCH decoding or vice versa. It is thus possible to accurately detect the timing at which the presence of packet data has truly switched to the absence of the packet data and vice versa on the transmitting side.

Note that, if the threshold value for the case where it is determined that there is no packet data is set at a higher value, it is possible to avoid such a situation in which packet data, which really do exist, are neglected on the receiving unit side, thereby preventing deterioration in the communication quality. If, on the other hand, the threshold value for the case of deciding that there exist packet data is set at a lower value, the timing at which packet data transmission has actually started may be detected at an earlier time. As a result, proper selective control of the normal receiving scheme may be exercised to allow maintaining a high receiving performance.

In this manner, the period in which packet data is not being received may be detected, and the receiving scheme during such period may forcibly be switched to a receiving scheme side having less power consumption, such as to decrease wasteful power consumption on the receiving side. In addition, transition from a period in which there is no packet data to a period in which there exist packet data may promptly be detected to render it possible to prevent deterioration of the receiving performance to maintain the high receiving performance at all times.

Although the exemplary embodiment 1 of the present invention has so far been explained in detail, the present invention may accommodate a wide variety of changes or modifications without being restricted to the above exemplary embodiment. The present invention may be applied to technical fields other than that described above without departing from the fundamental characteristics of the invention. It is to be understood that the exemplary embodiment disclosed herein is not for restriction and only for the sake of illustration in all of its aspects and that the total of the changes or modifications emanating from the scope equivalent to that of the claim is comprised within the scope of the present invention.

For example, in the above exemplary embodiment, the presence or absence of packet data in HSDPA packet communication is verified based on the result of HS-SCCH decoding. The presence or absence of packet data may similarly be verified in a communication system other than the HSDPA. That is, in case a wireless communication terminal is to switch between the RAKE receiving scheme and the adaptive equalizing receiving scheme in response to prevailing propagation environments, it is only sufficient that the presence or absence of packet data is verified based upon the decoding information of the physical control channel to effect the switching. This suppresses wasteful power consumption.

In the above exemplary embodiment, the receiving schemes used are presupposed to be the RAKE receiving scheme and the equalizing receiving scheme. It is however not intended to exclude applying the present invention to analogous or novel receiving schemes that may be prescribed or developed in time to come. In particular, there may be three or more receiving schemes, one of which may be selected depending upon the propagation environments or upon the presence or absence of packets. Additionally, the threshold values are set in the above Example so that TH1=30 and TH2=3. However, these threshold values may properly be set depending upon actual communication statuses, such as SIR, or upon operating environments, such as receiving accuracy at the wireless communication terminals. In a preferred Example, TH1 and TH2 may be set in a range from 1 to 10 and in a range from 10 to 50, respectively.

(Exemplary Embodiment 2)

Figure 11:
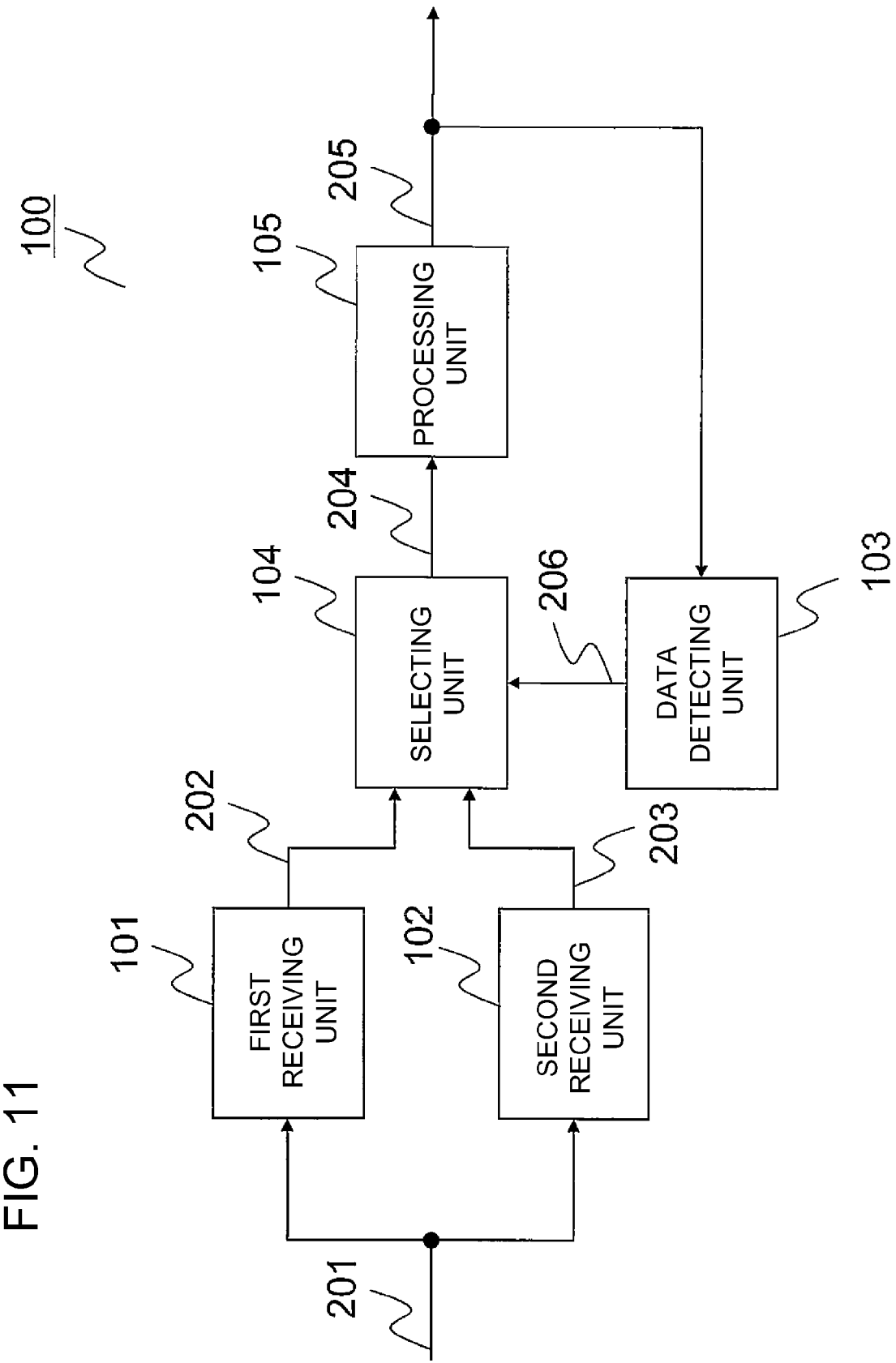
FIG. 11 is a functional block diagram showing a receiving device according to an exemplary embodiment 2 of the present invention.

A receiving device of an exemplary embodiment 2 of the present invention will now be described. FIG. 11 is a block diagram showing an arrangement of the receiving device of the exemplary embodiment 2 of the present invention. A receiving device 100 of the present exemplary embodiment includes a first receiving unit 101, a second receiving unit 102, a data detecting unit 103, a receiving unit selecting unit 104 and a processing unit 105.

The first receiving unit 101 receives an input signal 201 and performs preset receiving processing thereon to output a receiving signal 202. The second receiving unit 102 inputs the input signal 201 and performs preset receiving processing thereon to output another receiving signal 203. The receiving processing herein means preset processings needed for receiving the input signal 201 and outputting the receiving signal 202 or 203, such as amplification, detection or demodulation.

The first receiving unit 101 and the second receiving unit 102 are of characteristics differing from each other in connection with the receiving operation. For example, the first receiving unit 101 and the second receiving unit 102 are of circuit configurations differing from each other, or otherwise use receiving schemes differing from each other, and are constructed using different hardware. Hence, the first receiving unit 101 and the second receiving unit 102 differ from each other as to characteristics during signal reception, for example, as to power consumption, amount of heat evolution or reception sensitivity.

Therefore, if there exist no data for reception in the input signal 201, the receiving operation by one out of the first receiving unit 101 and the second receiving unit 102 is more desirable than that by the other in consideration of their differing characteristics. It is assumed in the present exemplary embodiment that, in case there is no data to be received in the input signal 201, the receiving operation by the first receiving unit 101 is more desirable.

The period in which there is no data to be received in the input signal 201 may, for example, be a void interval between the input signal 201 currently received and the input signal 201 to be received next. The period in which there is no data to be received in the input signal 201 may also be an interval before detection of the data to be received in the input signal 201, viz. a period of a so-called queuing.

The processing unit 105 performs preset processing on a further receiving signal 204 to output a processed further receiving signal 205. The preset processing herein may also encompass detecting a frame in a further receiving signal 204 and analyzing the frame configuration to extract the receiving data. The preset processing herein may further encompass a processing of decoding frame data in case the frame data is encoded or encrypted data.

The data detecting unit 103 detects whether or not data to be received is contained in the processed further receiving signal 205. If the data detecting unit has detected data to be received in the processed further receiving signal 205, it outputs a data detection signal 206. To detect whether or not the data to be received is contained in the processed further receiving signal 205, such a method may be used that detects whether or not a preset bit sequence is contained in the received signal. As typical of the bit sequence are a preamble and the address information indicating that the destination of transmission of the packet is the receiving device 100.

The receiving unit selecting unit 104 selects the receiving signals 202 or 203, based upon the data detection signal 206, to output the so selected receiving signal as the further receiving signal 204. Viz., if the data detection signal 206 is output, the receiving unit selecting unit 104 selects the receiving signal 203. If the data detection signal 206 is not output, the receiving unit selecting unit 104 selects the receiving signal 202.

In an initial state directly following the booting of the receiving device 100, it is sufficient for the selecting unit 104 to select one out of the receiving signal 202 or 203 without dependency upon the data detection signal 206. By so doing, the further receiving signal 204 may be delivered to the processing unit 105. The processing unit may then detect the data to be received in the further receiving signal 204.

Figure 12:
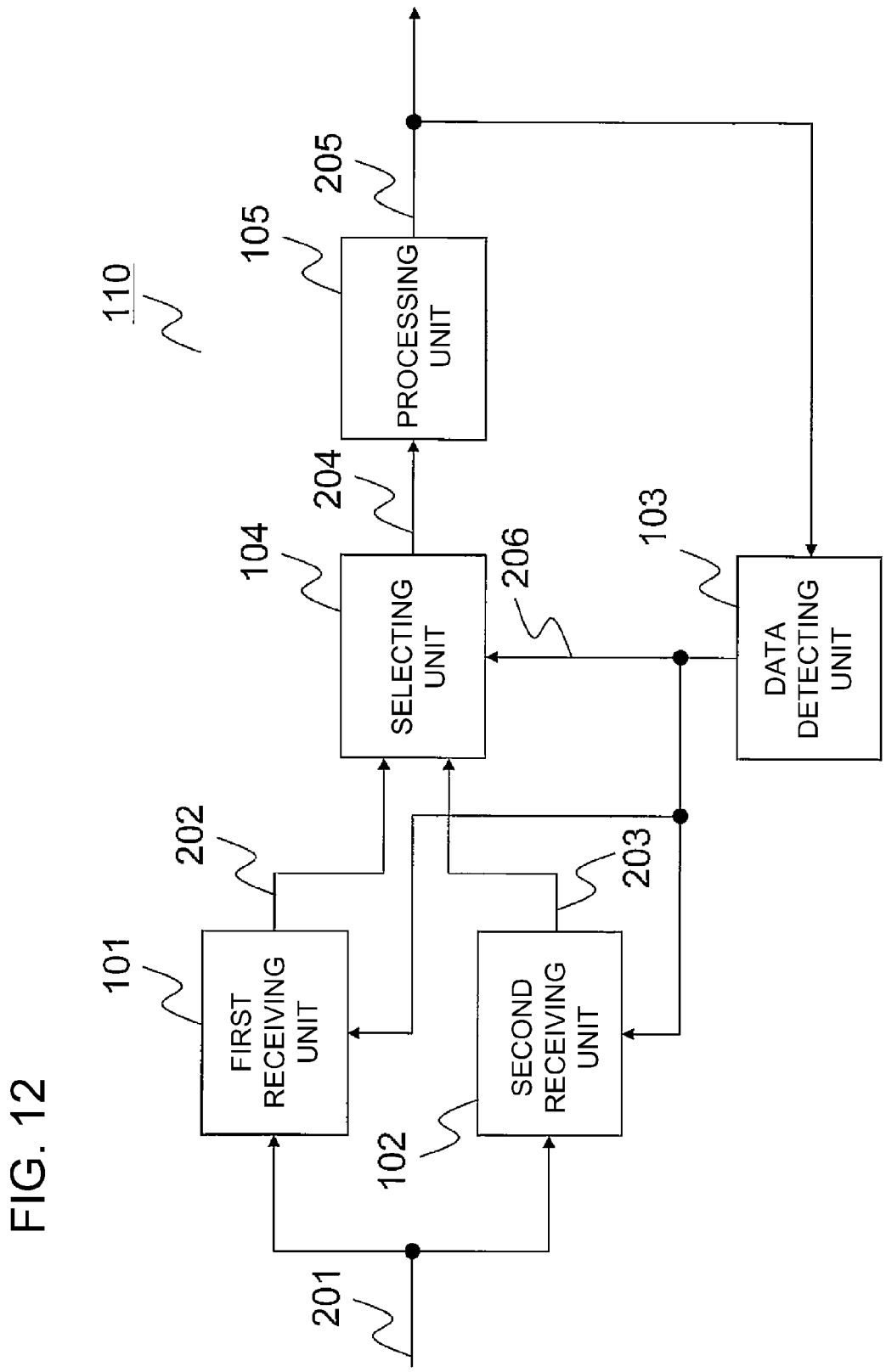
FIG. 12 is a block diagram showing a configuration of a modification of the receiving device according to exemplary embodiment 2 shown in FIG. 11.

If, as in a receiving device 110 of FIG. 12, the data detection signal 206 is output, the operation of the second receiving unit 102 may be permitted while that of the first receiving unit 101 may be inhibited. If conversely the data detection signal 206 is not output, the operation of the first receiving unit 101 may be permitted while that of the second receiving unit 102 may be inhibited. Preferably, the power consumption as well as the amount of heat evolution of the first receiving unit 101 or the second receiving unit 102 during operation is inhibited is less than the power consumption as well as the amount of heat evolution at the time of operation permission.

Figure 13:
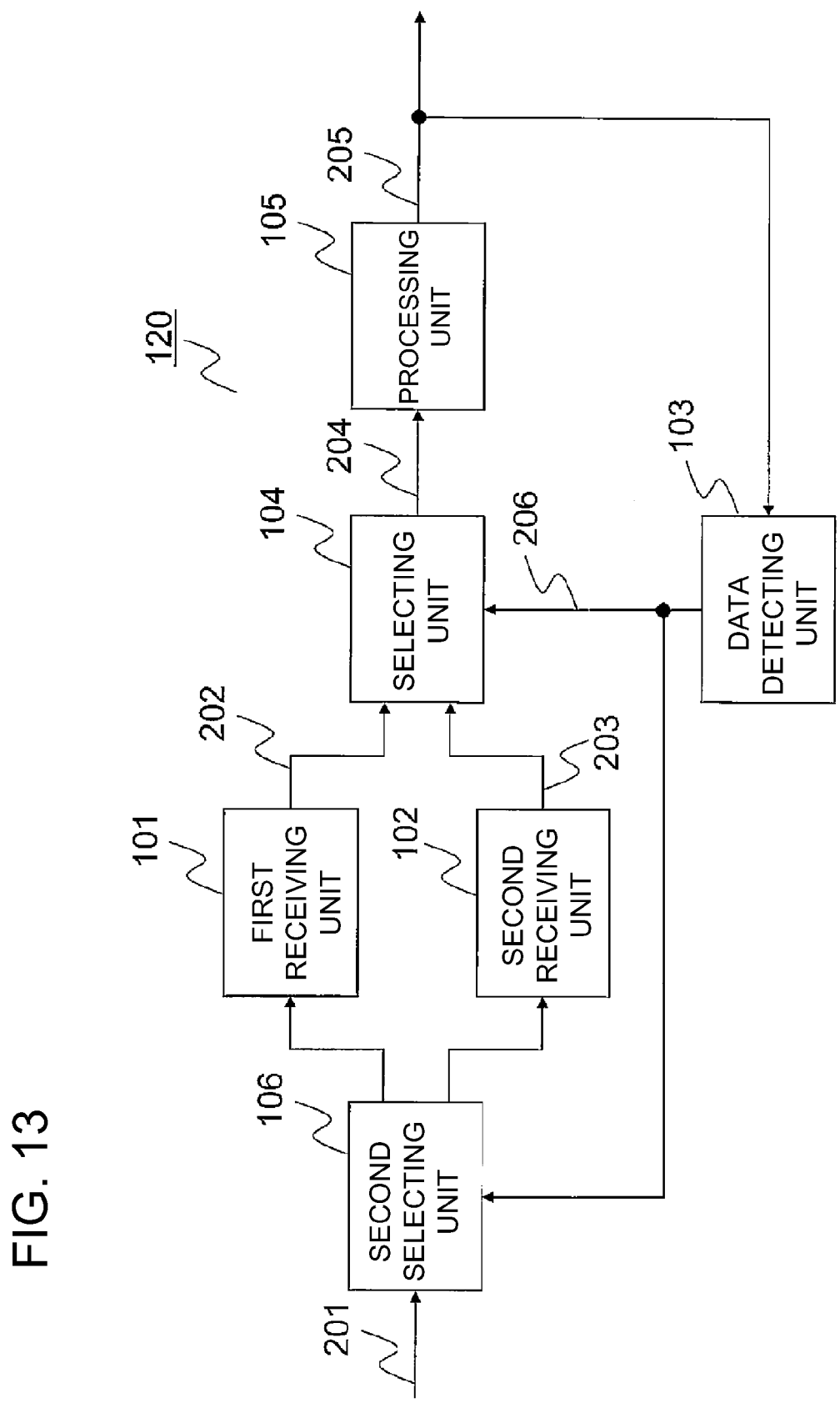
FIG. 13 is a block diagram showing a configuration of another modification of the receiving device according to exemplary embodiment 2 shown in FIG. 11.

Alternatively, a second selecting unit 106 may be provided, as in a receiving device 120 of FIG. 13. The second selecting unit 106 delivers an input signal 201 to the second receiving unit 102 if the data detection signal 206 is output. If the data detection signal 206 is not output, the second selecting unit delivers the input signal 201 to the first receiving unit 101. The power consumption as well as the amount of heat evolved in the first receiving unit 101 and the second receiving unit 102 in case the input signal 201 is not delivered thereto is preferably smaller than the power consumption as well as the amount of heat evolved in case the input signal 201 is delivered thereto. Additionally, the operation of the first or second receiving unit, not selected, may be inhibited using the data detection signal 206, as in the receiving device 110 of FIG. 12.

Although two receiving units are provided in the present exemplary embodiment, three or more receiving units may also be provided. It is then sufficient that the receiving unit, the characteristics of which for the case where there is no data to be received in the input signal 201 are most desirable, is selected in case no data is detected.

Also, in the receiving device 100, the first receiving unit or the second receiving unit is selected, depending upon the presence or absence of data to be received in the input signal, in order to perform the receiving processing. Hence, no limitations are imposed on the configuration of the input signal 201. The input signal 201 may thus be a wireless signal or a wired signal, whichever is desired.

The receiving device of the exemplary embodiment 2 thus selects the first receiving unit or the second receiving unit depending upon the presence or absence in the input signal of the data to be received. Hence, there may be derived an advantage that the receiving unit having more desirable characteristics may be selected depending upon the presence or absence in the input signal of the data to be received.

(Exemplary Embodiment 3)

Figure 14:
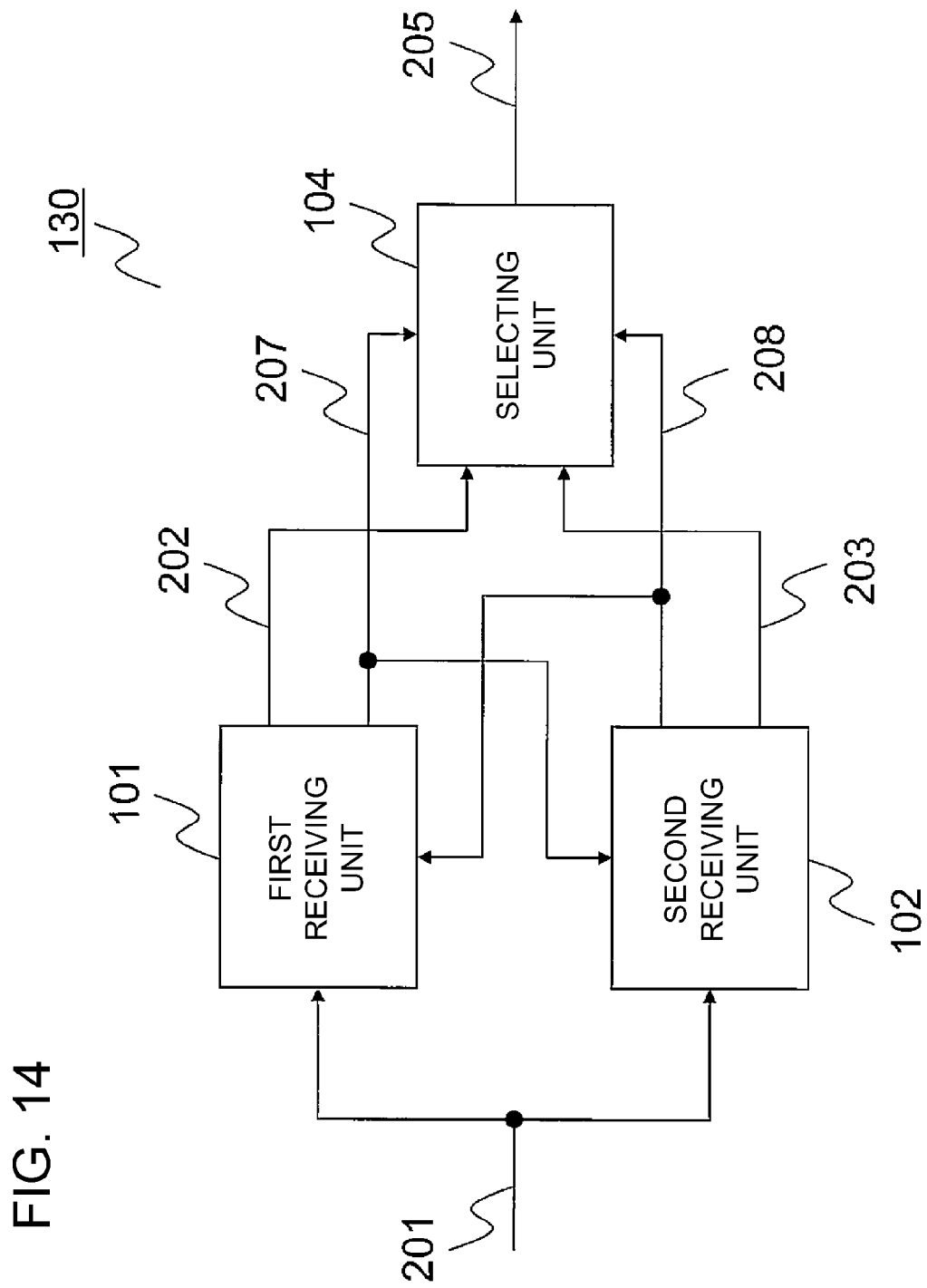
FIG. 14 is a functional block diagram showing a receiving device according to exemplary embodiment 3 of the present invention.

The presence or absence of a packet in the input signal may be detected by a receiving unit. FIG. 14 depicts a block diagram showing an arrangement of a receiving device according to an exemplary embodiment 3 of the present invention.

A receiving device 130 of the present exemplary embodiment includes a first receiving unit 101, a second receiving unit 102 and a selecting unit 104. The first receiving unit 101 and the second receiving unit 102 are of characteristics differing from each other in connection with the receiving operation, as in the exemplary embodiment 2.

If the first receiving unit 101 has failed to detect data to be received in the input signal 201, it outputs a non-data detection signal 207. If the second receiving unit 102 has detected the data to be received in the input signal 201, it outputs a data detection signal 208.

When the data detection signal 208 is output, the first receiving unit 101 terminates outputting a first receiving signal 202. If the data detection signal 208 is not output, the first receiving unit 101 inputs the input signal 201 and performs preset receiving processing thereon to output a receiving signal 202.

When the non-data detection signal 207 is output, the second receiving unit 102 terminates outputting a second receiving signal 203. If the non-data detection signal 207 is not output, the second receiving unit 102 receives the input signal 201 and performs preset receiving processing thereon to output the receiving signal 203.

When the non-data detection signal is output, the selecting unit 104 selects the first receiving signal. When the data detection signal is output, the selecting unit 104 selects the second receiving signal to output a third receiving signal 205.

It is seen from above that, in the receiving device 130, only one out of the first receiving unit 101 and the second receiving unit 102 is in operation, at all times, depending upon the presence or absence of data to be received in the input signal, thus outputting a receiving signal.

Thus, in the receiving device of the exemplary embodiment 3, the first receiving unit or the second receiving unit is selected based upon the presence or absence of data to be received in the input signal. There may thus be derived an advantage that the receiving unit having more proper characteristics may be selected depending upon the presence or absence of the data to be received in the input signal.

Additionally, the receiving device of the exemplary embodiment 3 detects the presence or absence in the input signal of data to be received. Hence, there is no necessity of providing a data detecting unit. In addition, it is possible to cope with such a situation where complex processing is needed in determining the presence or absence of data to be received, such as when the input signal 201 has a preset frame structure and is in need of frame analysis.

The present invention may be applied to the field of electrical communication technology used in a wireless communication system, such as mobile phone.

EXPLANATION OF REFERENCE SYMBOLS 1 pre-processing unit
2 selection controlling unit
3 selecting unit
4 RAKE receiving unit
5 equalizing receiving unit
6 decoding unit
6a HS-SCCH decoding unit
6b HS-PDSCH decoding unit
7 packet detecting unit
101 first receiving unit
102 second receiving unit
103 data detecting unit
104 selecting unit
105 processing unit
106 second selecting unit
201 input signal
202, 203, 204 receiving signal
205 processed further receiving signal
206 data detection signal
207 non-data detection signal
208 data detection signal

What is claimed is:

1. A communication apparatus, comprising:
    two or more receiving units differing in characteristics from one another;
    a selecting unit selecting one out of said two or more receiving units; and
    a data detecting unit that detects data to be received, in an input signal, the data to be received being packet data;
    wherein the selecting unit selects one out of the two or more receiving units based upon a result of detection by the data detecting unit and based upon the characteristics of the receiving units,
    the communication apparatus is a wireless communication apparatus,
    when the packet data is included in the input signal, the selecting unit selects one of the receiving units from which a most satisfactory reception quality is expected to be obtained depending upon propagation environments of wireless signals,
    when the data detecting unit fails in decoding a control channel of wireless communication a first preset number of times consecutively, the data detecting unit decides that there is no data to be received, and
    when the data detecting unit succeeds in decoding the control channel a second preset number of times consecutively, the data decoding unit decides that there is data to be received, the first preset number of times being greater than the second preset number of times.

2. The communication apparatus according to claim 1, wherein
    said two or more receiving units include the two or more receiving units at least differing in circuit configurations.

3. The communication apparatus according to claim 1, wherein
    said two or more receiving units include the two or more receiving units at least differing in receiving system or scheme thereof.

4. The communication apparatus according to claim 1, wherein,
    when the data detecting unit does not detect said data in said input signal, said selecting unit selects one out of said two or more receiving units based upon said result of detection and based upon said characteristics.

5. The communication apparatus according to claim 1, wherein,
    power consumption of a first one of said two or more receiving units during a period of time said data is not being received is less than that of the other receiving unit(s), and
    said selecting unit selects the first receiving unit when there is no data in said input signal.

6. The communication apparatus according to claim 1, wherein,
    when the selecting unit has selected one out of said two or more receiving units, said selecting unit sets the other receiving unit(s) in a state of low power consumption.

7. The communication apparatus according to claim 1, further comprising:
a second selecting unit,
wherein,
when the selecting unit has selected a second one out of said two or more receiving units, said second selecting unit causes said input signal to be delivered to said second receiving unit.

8. The communication apparatus according to claim 7, wherein,
power consumption of said second receiving unit during a period of time said input signal is not delivered thereto is less than that of said second receiving unit during a period of time said input signal is delivered thereto.

9. A communication apparatus comprising:
a first receiving unit that inputs an input signal to output a first receiving signal and that, when data is not detected in said input signal, outputs a non-data detection signal, the data being packet data;
a second receiving unit that inputs said input signal to output a second receiving signal and that, when data is detected in the input signal, outputs a data detection signal; and
a selecting unit that selects said first receiving signal or said second receiving signal to output a third receiving signal,
wherein characteristics of said first receiving unit during a period of time said data is not being received thereto differ from characteristics of said second receiving unit during a period of time said data is not being received thereto,
said first receiving unit terminates a receiving operation when the data detection signal is output,
said second receiving unit terminates a receiving operation when the non-data detection signal is output,
said selecting unit selects said first receiving signal when the non-data detection signal is output,
said selecting unit selects said second receiving signal when the data detection signal is output,
the communication apparatus is a wireless communication apparatus,
when the packet data is included in the input signal, the selecting unit selects one of the receiving units from which a most satisfactory reception quality is expected to be obtained depending upon propagation environments of wireless signals,
when the data detecting unit fails in decoding a control channel of wireless communication a first preset number of times consecutively, the data detecting unit decides that there is no data to be received, and
when the data detecting unit succeeds in decoding the control channel a second preset number of times consecutively, the data decoding unit decides that there is data to be received, the first preset number of times being greater than the second preset number of times.

10. A control method for controlling a communication apparatus having two or more receiving units differing in characteristics from one another, said method comprising:
deciding on a presence or an absence in an input signal of data to be received; and
selecting one out of said two or more receiving units based upon the presence or the absence of said data to be received and upon the characteristics of said receiving units,
wherein the communication apparatus is a wireless communication apparatus,
when failure in decoding a control channel of wireless communication a first preset number of times consecutively occurs, the deciding decides that there is no data to be received, and
when success in decoding the control channel a second preset number of times consecutively occurs, the deciding decides that there is data to be received, the first preset number of times being greater than the second preset number of times.

11. The control method according to claim 10, wherein,
said selecting selects, when the data to be received is not contained in said input signal, the receiving unit whose power consumption during a period of time of not receiving the data is smaller than a power consumption of the remaining receiving unit(s).

12. The control method according to claim 10, further comprising:
setting, when selecting one out of said two or more receiving units, a state of low power consumption in the remaining receiving unit(s).

13. The control method according to claim 10, wherein,
said selecting selects, when the data to be received is contained in said input signal, one of the receiving units from which a most satisfactory receiving quality is expected to be obtained depending upon propagation environments of said input signal.

14. A control program embodied in a non-transient computer readable medium for allowing a communication apparatus having two or more receiving units differing in characteristics from one another to execute, said program causing said communication apparatus to execute a method, comprising:
deciding on a presence or an absence in an output signal of data to be received; and
selecting one out of said two or more receiving units based upon the presence or the absence of said data to be received and upon the characteristics of said receiving units,
wherein the communication apparatus is a wireless communication apparatus,
when failure in decoding a control channel of wireless communication a first preset number of times consecutively occurs, the deciding decides that there is no data to be received, and
when success in decoding the control channel a second preset number of times consecutively occurs, the deciding decides that there is data to be received, the first preset number of times being greater than the second preset number of times.

15. The control program according to claim 14, wherein,
said selecting selects, when the data to be received is not contained in said input signal, one of the receiving units whose power consumption during a period of time of not receiving the data is smaller than that of the remaining receiving unit(s) during a period of time of not receiving the data.

16. The control program according to claim 14, further comprising:
allowing said communication apparatus to execute setting, when selecting one out of said two or more receiving units, a state of low power consumption in the remaining receiving unit(s).

17. The control program according to claim 14, wherein,
said selecting selects, when the data to be received is contained in said input signal, one of the receiving units from which a most satisfactory receiving quality is expected to be obtained depending upon propagation environments of said input signal.

* * * * *